(12) United States Patent
Kim et al.

(10) Patent No.: US 12,730,537 B2
(45) Date of Patent: Sep. 8, 2026

(54) DISPLAY DEVICE

(71) Applicant: LG Display Co., Ltd., Seoul (KR)

(72) Inventors: Byungwoong Kim, Paju-si (KR); Seunghyun Cho, Paju-si (KR); Jongyul Lim, Paju-si (KR); Junsu Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 37 days.

(21) Appl. No.: 18/968,964

(22) Filed: Dec. 4, 2024

(65) Prior Publication Data

US 2025/0216982 A1 Jul. 3, 2025

(30) Foreign Application Priority Data

Dec. 28, 2023 (KR) ........................ 10-2023-0195427

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/04164* (2019.05); *G06F 3/0443* (2019.05); *G06F 3/0446* (2019.05); *G06F 2203/04107* (2013.01); *G06F 2203/04111* (2013.01)

(58) Field of Classification Search
CPC .. G06F 3/0418; G06F 3/04164; G06F 3/0412; G06F 3/0446; G06F 3/0443; G06F 2203/04107; G06F 2203/04111
See application file for complete search history.

(56) References Cited

U.S. PATENT DOCUMENTS 10,223,965 B2 * 3/2019 Bi .......................... G09G 3/006
2017/0256199 A1 * 9/2017 Bi .......................... G09G 3/3233
2019/0107909 A1 * 4/2019 Kim ...................... G06F 3/0412
2020/0142563 A1 * 5/2020 Kim ...................... G06F 3/0443

FOREIGN PATENT DOCUMENTS

KR 10-2021-0083794 A 7/2021

* cited by examiner

*Primary Examiner* — Peter D Mcloone
(74) *Attorney, Agent, or Firm* — Fenwick & West LLP

(57) ABSTRACT

A display device is disclosed that comprises: a display panel including a display area in which pixels and touch electrodes are disposed and a non-display area surrounding the display area; a ground line disposed in the non-display area and configured to apply a ground voltage to the display panel during display driving and touch driving; and a compensation unit configured to receive a feedback signal from the ground line and output an inverted signal having an anti-phase of the feedback signal to the ground line.

18 Claims, 13 Drawing Sheets

DISPLAY DEVICE

CROSS REFERENCE TO RELATED APPLICATION

The present application claims priority to Republic of Korea Patent Application No. 10-2023-0195427, filed Dec. 28, 2023, which is hereby incorporated by reference in its entirety.

BACKGROUND

Field of Technology

The present disclosure relates to a display device, and more specifically, to a display device in which noise generated from a touch display panel is removed using an inverted signal.

Description of the Related Art

In general, display devices each includes a display panel on which pixels are disposed, a gate driver for supplying gate signals to the pixels through gate lines, a data driver for applying data signals to the pixels through data lines, and a timing controller for controlling operations of the gate driver and the data driver.

In the case of a display device having a large area and high resolution, the number of control signals applied from the timing controller to the gate driver and the data driver increases, and thus noise due to electromagnetic interference (EMI) increases. In particular, when the display device is implemented as a touch-integrated display device, noise further increases due to a touch driving signal.

Since such noise can reduce the quality of images displayed on the display panel and degrade touch performance, there is a need for a method for reducing the noise.

SUMMARY

Embodiments are directed to providing a display device in which noise radiated from a touch-integrated display panel is reduced using a field cancel technology through an inverted signal.

The embodiments are also directed to providing a display device that cancels noise generated during display driving and touch driving using one inverted signal.

The embodiments are also directed to providing a display device using a ground voltage applied from the outside as a reference voltage of the inverted signal.

A display device according to one embodiment may include a display panel including a display area in which pixels and touch electrodes are disposed and a non-display area surrounding the display area, a ground line disposed in the non-display area and configured to apply a ground voltage to the display panel during display driving and touch driving, and a compensation unit configured to receive a feedback signal from the ground line and output an inverted signal having an anti-phase of the feedback signal to the ground line.

The ground line may include a display ground line through which the ground voltage is applied to the pixels during the display driving, and a touch ground line through which the ground voltage is applied to the display panel during the touch driving.

The display ground line may be formed along the non-display area to surround the display area, and the touch ground line may be formed along the non-display area closer to the display area than the display ground line.

The compensation unit may include an inverting amplifier configured to receive the feedback signal from the display ground line and the touch ground line through a first input terminal, receive the ground voltage through a second input terminal, invert and amplify a signal corresponding to a difference between the feedback signal and the ground voltage, and output the inverted and amplified signal to an output terminal as the inverted signal.

The first input terminal of the inverting amplifier may be electrically connected to the display ground line and the touch ground line at one side of the non-display area, and the output terminal of the inverting amplifier may be electrically connected to the display ground line and the touch ground line at the other side opposite to the one side of the non-display area.

The compensation unit may include a first control circuit connected to the first input terminal of the inverting amplifier and including at least one resistor connected between the first input terminal and the ground line, and a second control circuit connected to the output terminal of the inverting amplifier and including at least one resistor connected between the output terminal and the ground line.

The display device may further include a source printed circuit board connected to the display panel through a circuit film, and a control printed circuit board connected to the source printed circuit board through a connection cable and receive the ground voltage from an external host through a ground input terminal.

The second input terminal of the inverting amplifier may be directly connected to the ground input terminal of the control printed circuit board.

The inverting amplifier may output the inverted signal to the ground line through an inverted signal line and the inverted signal line and the ground line may be electrically connected through a bridge electrode.

The inverted signal line may include a first inverted signal line branched from an output terminal of the compensation unit and extending adjacent to the display ground line, and a second inverted signal line branched from the output terminal of the compensation unit and extending adjacent to the touch ground line.

The display panel may include a substrate, a display driving layer which is formed on the substrate and on which the pixels are disposed, and a touch driving layer which is formed on the display driving layer and on which the touch electrodes are disposed.

The display driving layer may include a buffer layer formed on the substrate, a first bridge electrode formed on the buffer layer, an interlayer insulating layer formed on the first bridge electrode, and the display ground line and the first inverted signal line formed on the interlayer insulating layer, and the display ground line and the first inverted signal line may be electrically connected through the first bridge electrode.

The touch driving layer may include a touch buffer layer formed on the display driving layer, a second bridge electrode formed on the touch buffer layer, a touch insulating layer formed on the second bridge electrode, and the touch ground line and the second inverted signal line formed on the touch insulating layer, and the touch ground line and the second inverted signal line may be electrically connected through the second bridge electrode.

The feedback signal may include noise components generated from the display ground line and the touch ground line, and the compensation unit may be configured to cancel the noise components generated from the display ground line and the touch ground line using one inverted signal.

A display device according to one embodiment may include a display panel including a display area in which pixels and touch electrodes are disposed and a non-display area surrounding the display area, a ground line disposed in the non-display area and configured to apply a ground voltage to the display panel during display driving and touch driving, and a compensation unit configured to receive a feedback signal from the ground line and output an inverted signal having an anti-phase of the feedback signal to the ground line, wherein the compensation unit may use a ground voltage directly applied from an external host as a reference voltage.

The display device may further include a source printed circuit board connected to the display panel through a circuit film, and a control printed circuit board connected to the source printed circuit board through a connection cable and receive the ground voltage from the external host through a ground input terminal.

The compensation unit may be directly connected to the ground input terminal of the control printed circuit board.

DETAILED DESCRIPTION

Figure 1:
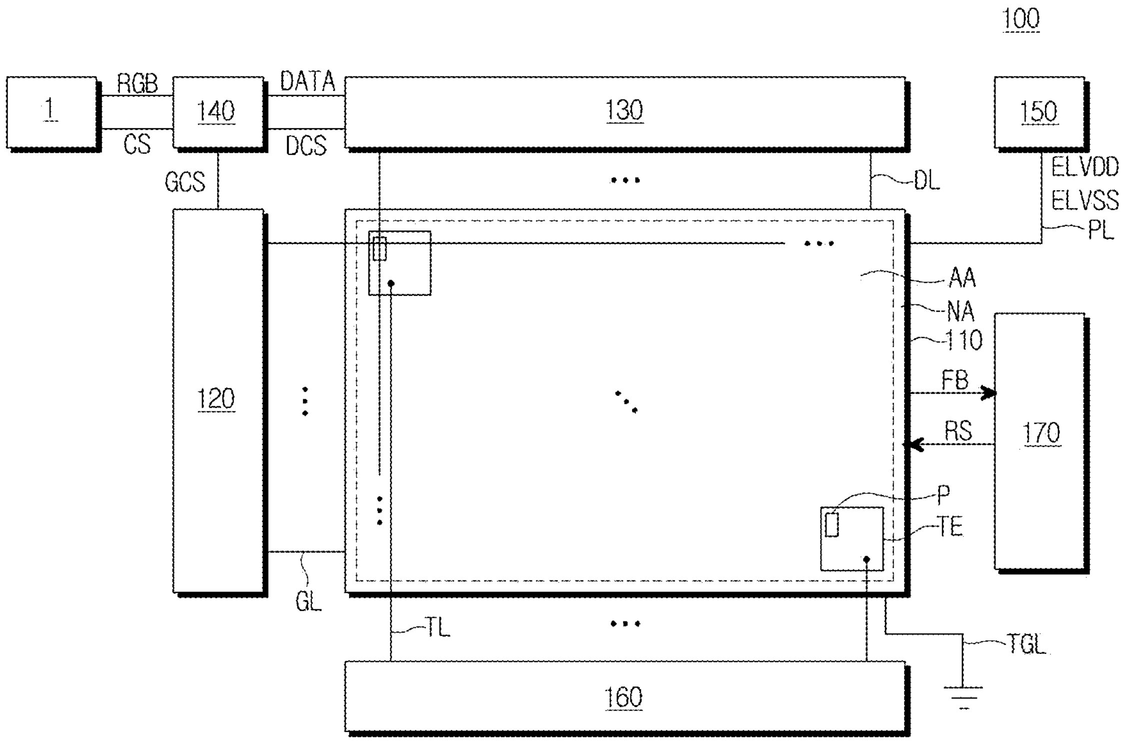
FIG. 1 is a block diagram schematically showing components of a display device according to one embodiment.

Hereinafter, embodiments will be described with reference to the accompanying drawings. In the specification, when a first component (or an area, a layer, a portion, or the like) is described as "on," "connected," or "coupled to" a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term "and" includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a block diagram schematically showing components of a display device according to one embodiment.

Referring to FIG. 1, a display device 100 according to one embodiment may include a display panel 110 and a driving unit for driving the display panel 110. The driving unit may include a data driver 120, a gate driver 130, a timing controller 140, and a power supply unit 150.

The display panel 110 may include a display area AA in which a plurality of pixels P are disposed and a non-display area NA surrounding the display area AA.

The display panel 110 may include data lines DL, gate lines GL that intersect the data lines DL, and an array of pixels defined in intersection areas of the data lines DL and the gate lines GL, which are disposed in the display area AA. Each pixel P may include transistors connected to the corresponding data line DL and gate line GL, a storage capacitor, and a light emitting element connected to the data lines DL, the gate lines GL, and the storage capacitor. Each pixel P may emit light in response to the amount of current flowing through the light emitting element under the control of transistors.

The driving unit for controlling the amount of current to be applied to the pixels P may be disposed in the non-display area NA.

The timing controller 140 may perform overall control functions related to driving the display panel 110 and control operations of the data driver 120 and the gate driver 130. The timing controller 140 receives an image signal RGB and a timing signal CS transmitted from an external host 1, etc. to generate a data control signal DCS and a gate control signal GCS. The timing signal CS may include a data enable signal, a horizontal synchronization signal, a vertical synchronization signal, a clock signal, etc. The data control signal DCS is output to the data driver 120, and the gate control signal GCS is output to the gate driver 130. The timing controller

140 generates digital image data DATA from the image signal transmitted from the external system and outputs the digital image data DATA to the data driver 120.

The data driver 120 converts the digital image data DATA into an analog data voltage according to the data control signal DCS. The data driver 120 may apply the analog data voltage to the corresponding pixels P through the data line DL. In one embodiment, a multiplexer (not shown) may be disposed between the data driver 120 and the data lines DL. The multiplexer may distribute the data voltage input from the data driver 120 to the data lines DL under the control of the timing controller 140.

The gate driver 130 may sequentially output gate signals by one horizontal period through the gate line GL in response to signals input from the timing controller 140. A pixel row connected to each gate line GL may be turned on by one horizontal period in response to the gate signal.

The power supply unit 150 (e.g., a circuit) may supply various voltages or currents to the display panel 110, the data driver 120, the gate driver 130, etc. or control various voltages or currents to be supplied to the display panel 110, the data driver 120, the gate driver 130, etc. For example, the power supply unit 150 may supply driving voltages ELVDD and ELVSS for driving the pixels P through the corresponding power line PL.

The display device 100 according to one embodiment may be a display device including a backlight unit such as a light crystal display (LCD) device and may be a self-luminous display device, such as an organic light emitting diode (OLED) display device, a quantum dot display device, and a micro light emitting diode (LED) display device.

When the display device 100 is the OLED display device, each pixel PX may include an OLED that emits light by themselves as a light emitting element. When the display device 100 is the quantum dot display device, each pixel PX may include a light emitting element formed of quantum dots that are semiconductor crystals that emit light by themselves. When the display device 100 is the micro-LED display device, each pixel PX may include micro-LEDs, which emit light by themselves and are made of an inorganic material, as a light emitting element.

In one embodiment, the display device 100 may be a touch display, and the display panel 110 may be a touch-integrated display panel. In the present embodiment, a plurality of touch electrodes TE for touch sensing may be formed in the display area AA. In addition, the display device 100 may further include a touch driver 160 for driving the touch electrodes TE.

The touch electrode TE may be electrically connected to a touch sensing line TL to receive a touch control signal and output a touch sensing signal in response to the touch control signal. Each touch electrode TE may be disposed to overlap one or more pixels P.

The touch driver 160 may supply the touch driving signal to the touch electrode TE through the touch sensing line TL and receive the touch sensing signal from the touch electrode TE. In one embodiment, the touch driver 160 may perform touch sensing by supplying the touch driving signal to the touch electrode TE during a display driving period or a period temporally divided from the display driving period. The touch driver 160 may convert the touch sensing signal into digital touch sensing data and detect the presence or absence of a touch and touch coordinates based on the touch sensing data.

The touch-integrated display panel may be configured to receive a ground voltage through a touch ground line TGL. The touch ground line TGL may perform a function such as electrostatic protection.

In one embodiment, the display device 100 may further include a compensation unit 170 (e.g., a circuit) for canceling noise generated from the display panel 110. The compensation unit 170 may be electrically connected to wirings formed on the display panel 110 to receive a feedback signal FB. The compensation unit 170 may detect the noise generated from the display panel 110 through the feedback signal FB.

The compensation unit 170 may generate an inverted signal RS in the form of an anti-phase in which a phase of the noise is inverted to cancel the detected noise and apply the generated inverted signal RS to a driving power line formed on the display panel 110 through the inverted signal line RL. Through the compensation unit 170, the noise generated during the display driving and touch driving of the display device 100 implemented as a touch display may be canceled.

In one embodiment, the compensation unit 170 may be configured to compensate noise in a ground voltage line provided to apply a ground voltage to the display panel 110. For example, when the low potential driving voltage ELVSS applied to the pixels P during the display driving is set to the ground voltage, the compensation unit 170 may receive the feedback signal FB from the power line PL to which the low potential driving voltage ELVSS is applied, generate the corresponding inverted signal RS, and transmit the inverted signal RS to the driving power line PL.

Alternatively, the compensation unit 170 may receive the feedback signal FB from the touch ground line TGL, generate the corresponding inverted signal RS, and transmit the inverted signal RS to the touch ground line TGL.

Figure 2:
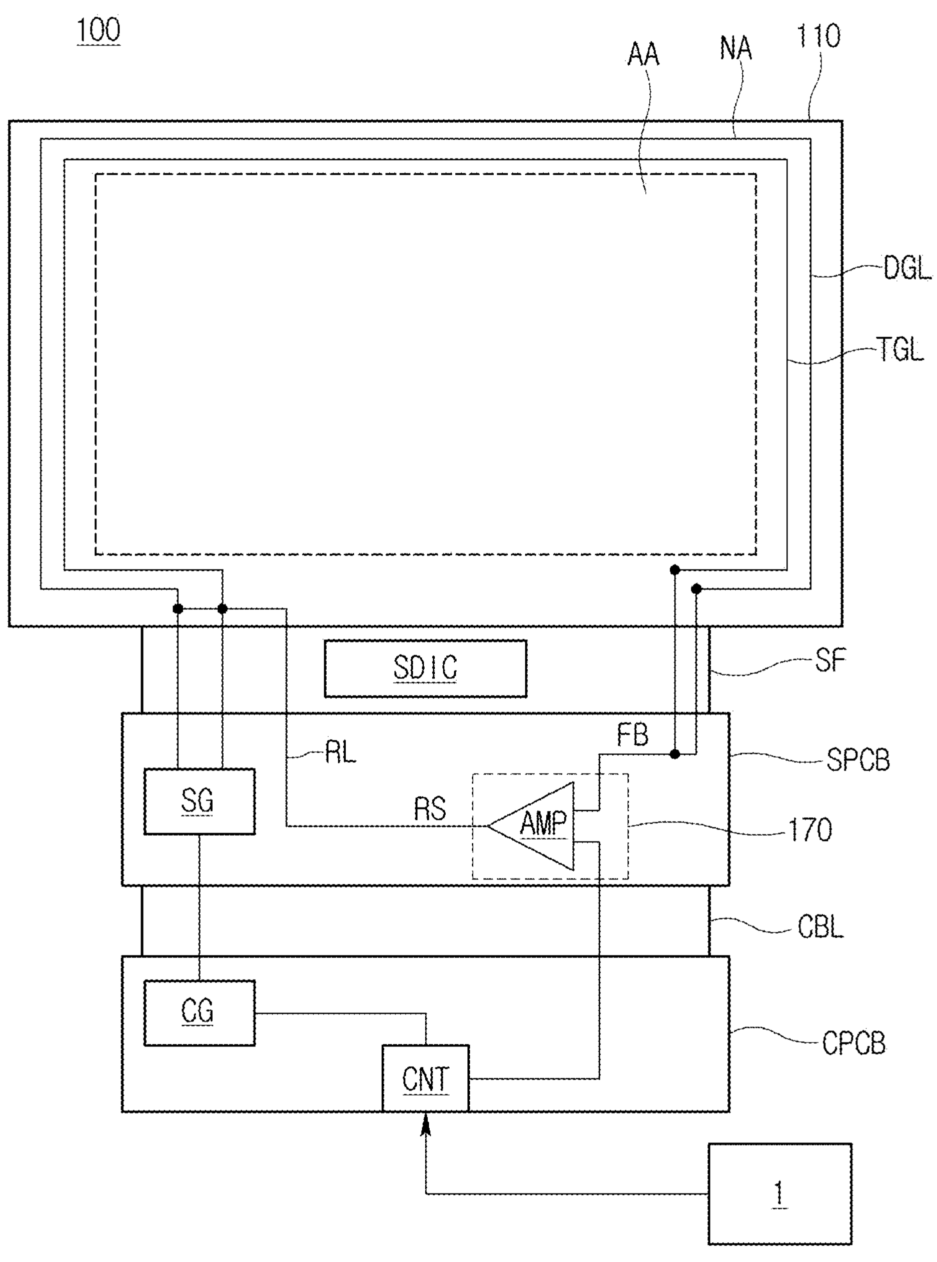
FIG. 2 is a schematic plan view of the display device according to one embodiment.

FIG. 2 is a schematic plan view of the display device according to one embodiment. For convenience of description, the display panel 110 and the compensation unit 170 shown in FIG. 1 are shown in FIG. 2.

Referring to FIG. 2, the display panel 110 may include the display area AA in which images are displayed and the non-display area NA in which the images are not displayed. The pixels P (see FIG. 1) and the touch electrodes TE (see FIG. 1) may be disposed in the display area AA, and the driving unit and the lines for driving the pixels P may be disposed in the non-display area NA.

For example, the gate driver 130 (see FIG. 1) may be mounted in the non-display area NA. In the present embodiment, the gate driver 130 may be implemented in a gate in panel (GIP) type.

The gate driver 130 may be disposed at one side or both sides (left and right sides) of the display panel 110. The gate driver 130 may be disposed at both sides (e.g., left and right sides) of the display panel 110 or disposed on two or more side surfaces among four side surfaces of the display panel 110 according to a driving method, a panel design method, etc.

Lines through which control signals and/or driving voltages are applied to the pixels P and the touch electrodes TE disposed in the display area AA may be disposed in the non-display area NA.

For example, a display ground line DGL through which the ground voltage is applied as the low potential driving voltage ELVSS (see FIG. 1) may be disposed in the non-display area NA. The display ground line DGL may be a planar electrode formed in the non-display area NA of the display panel 110. In one embodiment, the display ground line DGL may be formed in a closed loop along the non-display area NA to surround the display area AA in which the pixels P (see FIG. 1) are disposed, but is not limited thereto. The display ground line DGL may extend to the display panel 110 along one side surfaces of a control printed circuit board CPCB, a connection cable CBL, a source printed circuit board SPCB, and a circuit film SF to supply the low potential driving voltage ELVSS to the display panel 110.

The low potential driving voltage ELVSS may be power applied to the pixels P disposed on the display panel 110 for display driving. In this case, the display ground line DGL may be electrically connected to cathodes of the OLEDs provided in the pixels P.

The touch ground line TGL may be further disposed in the non-display area NA. The touch ground line TGL may be formed along the non-display area NA to surround the display area AA in which the touch electrodes TE (see FIG. 1) are disposed. In one embodiment, the touch ground line TGL may be disposed closer to the display area AA than the display ground line DGL, but is not limited thereto. The touch ground line TGL may extend to the display panel 110 along one side surfaces of the control printed circuit board CPCB, the connection cable CBL, the source printed circuit board SPCB, and the circuit film SF to supply the ground voltage to the display panel 110. In the present embodiment, the touch ground line TGL may be connected to a source ground connector SG formed on the source printed circuit board SPCB and configured to receive the ground voltage.

The display device 100 may include the source printed circuit board SPCB for circuitry connection between one or more source driver integrated circuits SDIC and other devices, and the control printed circuit board CPCB on which control components and various electrical components are mounted.

The source printed circuit board SPCB may be connected to the display panel 110 through the circuit film SF. In other words, the circuit film SF may have one side connected to the non-display area NA of the display panel 110 and the other side connected to the source printed circuit board SPCB.

One or more source driver integrated circuits SDIC constituting the data driver 120 (see FIG. 1) may be mounted on the source printed circuit board SPCB. In the present embodiment, each source driver integrated circuit SDIC may be implemented in a chip on film (COF) type.

Each source driver integrated circuit SDIC may include a shift register, a latch circuit, a digital to analog converter, an output buffer, etc. Each source driver integrated circuit SDIC may further include an analog to digital converter in some cases.

The compensation unit 170, etc. may be mounted on the source printed circuit board SPCB. The compensation unit 170 may be connected to ground lines formed on the display panel 110 to detect the noise generated from the display panel 110. For example, the compensation unit 170 may be electrically connected to at least one point of the display ground line DGL and at least one point of the touch ground line TGL.

To detect noise, a location at which the compensation unit 170 and the ground line are connected may be determined in any of various ways. In one embodiment, the compensation unit 170 may be electrically connected to the ground line at one side of the non-display area NA as shown. However, the present embodiment is not limited thereto. For example, in another embodiment, the compensation unit 170 may be connected to the ground line at a predetermined location on the circuit film SF or a predetermined location on the source printed circuit board SPCB.

The compensation unit 170 may receive the feedback signal FB from the ground line. For example, the compensation unit 170 may detect the feedback signal FB transmitted from the display ground line DGL and the touch ground line TGL. The detected feedback signal FB may include a noise component generated from the display panel 110 by a signal (e.g., a voltage) applied to the ground line.

The compensation unit 170 may generate the inverted signal RS and apply the inverted signal to the display panel 110 to cancel the detected noise. To this end, the compensation unit 170 may be configured to include an inverting amplifier AMP for receiving the feedback signal FB through a first input terminal and the ground voltage through a second input terminal.

The inverting amplifier AMP may invert and amplify a signal corresponding to a difference between the feedback signal FB and the ground voltage and output the inverted and amplified signal as the inverted signal RS. The compensation unit 170 may apply the generated inverted signal RS to the ground line through the inverted signal line RL. For example, the compensation unit 170 may apply the inverted signal RS to the display ground line DGL and the touch ground line TGL through the inverted signal line RL.

The inverted signal RS is an anti-phase signal opposite to a phase of the noise generated from the ground line and is applied to the ground line to cancel the noise. By applying the inverted signal RS to the display panel 110 through the ground line, it is possible to cancel and/or remove the noise generated from the display panel 110.

To apply the inverted signal RS to the ground line, the compensation unit 170 may be further connected to the ground lines formed on the display panel 110. The location at which the compensation unit 170 and the ground line are connected to apply the inverted signal RS may be determined in any of various ways. In one embodiment, the compensation unit 170 may be electrically connected to the ground line at the other side of the non-display area NA as shown. Here, the other side of the non-display area NA may be a location opposite to one side at which the compensation unit 170 and the ground line are connected to detect the noise. However, the present embodiment is not limited thereto. For example, in another embodiment, the compensation unit 170 may be further connected to the ground line at a predetermined location on the source printed circuit board SPCB.

A more detailed configuration of the compensation unit 170 will be described below with reference to FIG. 4.

The source ground connector SG (or a source ground terminal) may be formed on the source printed circuit board SPCB. The source ground connector SG may connect the ground line extending from the circuit film SF to the ground voltage. For example, the source ground connector SG may be connected to the display ground line DGL and the touch ground line TGL.

The source ground connector SG may be electrically connected to the control ground connector CG (or a control ground terminal) of the control printed circuit board CPCB. The source ground connector SG may transmit the ground voltage applied from a control ground connector CG of the control printed circuit board CPCB to the connected ground line.

The timing controller 140 (see FIG. 1), the power supply unit 150 (see FIG. 1), the touch driver 160 (see FIG. 1), etc. may be mounted on the control printed circuit board CPCB.

The timing controller 140 may perform overall control functions related to driving the pixels P disposed on the display panel 110 and control the operations of the data driver 120 and the gate driver 130. The power supply unit 150 may supply various voltages or currents to the data driver 120 and the gate driver 130 or control various voltages or currents to be supplied to the data driver 120, the gate driver 130, etc. The timing controller 140 may be implemented as various circuits or electronic components, such as an integrated circuit (IC), a field programmable gate array (FPGA), an application specific integrated circuit (ASIC), and a processor. The touch driver 160 may perform overall control functions related to driving the touch electrodes TE disposed on the display panel 110.

The control ground connector CG may be formed on the control printed circuit board CPCB. The control ground connector CG may receive the ground voltage from the external host 1, etc. through a ground input terminal CNT formed on the control printed circuit board CPCB. The control ground connector CG may be electrically connected to the source ground connector SG to apply the ground voltage to the source ground connector SG.

In one embodiment, the control ground connector CG formed on the control printed circuit board CPCB may be directly connected to the inverting amplifier AMP of the compensation unit 170. For example, the control ground connector CG may be connected directly to a second input terminal of the inverting amplifier AMP. In the present embodiment, the inverting amplifier AMP can increase the accuracy of the inverted signal RS using the ground voltage directly input from the external host 1 as the reference voltage.

The source printed circuit board SPCB and the control printed circuit board CPCB may be electrically connected through connection cables CBL. Here, the connection cable CBL may be, for example, a flexible printed circuit (FPC), a flexible flat cable (FFC), etc.

The at least one source printed circuit board SPCB and the control printed circuit board CPCB may be implemented integrally as one printed circuit board.

Figure 3:
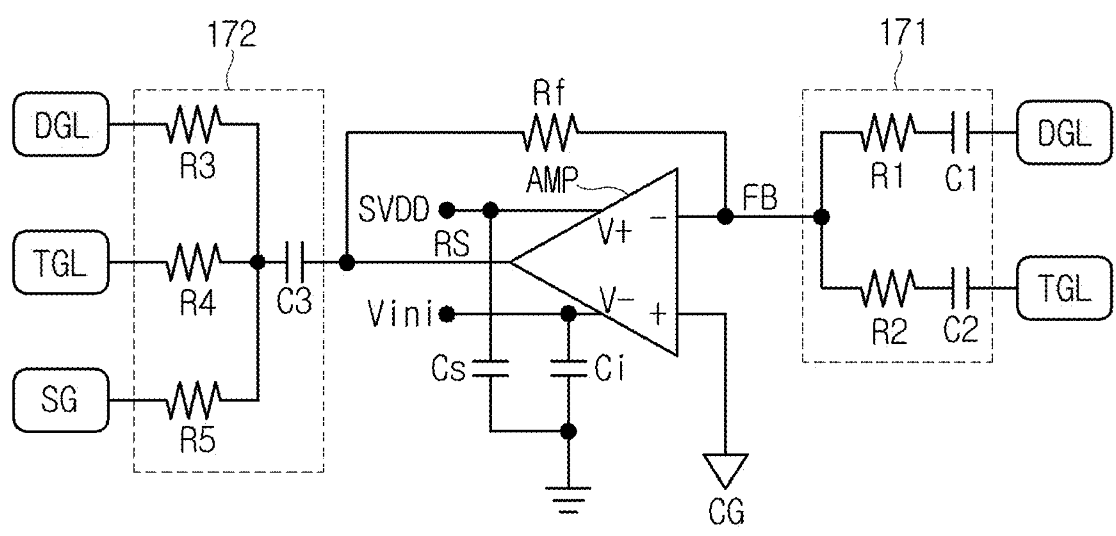
FIG. 3 is a circuit diagram more specifically showing a compensation unit of FIG. 2 according to one embodiment.

FIG. 3 is a circuit diagram more specifically showing a compensation unit of FIG. 2 according to one embodiment.

Referring to FIG. 3, the compensation unit 170 according to one embodiment may include the inverting amplifier AMP, a first control circuit 171 connected to an input terminal of the inverting amplifier AMP, and a second control circuit 172 connected to an output terminal of the inverting amplifier AMP.

The first control circuit 171 may be connected to an inverting input terminal (−) of the inverting amplifier AMP. The first control circuit 171 may include at least one resistor R1 and R2 and at least one capacitor C1 and C2 connected between the inverting input terminal (−) of the inverting amplifier AMP and the ground line formed on the display panel 110.

For example, the first control circuit 171 may include a first resistor R1 and a first capacitor C1 connected in series between the inverting input terminal (−) of the inverting amplifier AMP and the display ground line DGL. In addition, the first control circuit 171 may include a second resistor R2 and a second capacitor C2 connected in series between the inverting input terminal (−) of the inverting amplifier AMP and the touch ground line TGL.

A first resistor R1 and the first capacitor C1 may filter only the noise component in the signal input via the display ground line DGL and transmit the filtered signal to the inverting input terminal (−) of the inverting amplifier AMP. In this case, a level of the signal to be filtered as the noise component may be controlled according to a value of the first resistor R1. In other words, the first resistor R1 may serve as a switching element for appropriately selecting the noise component in a first feedback signal FB1.

The second resistor R2 and the second capacitor C2 may filter only the noise component in the signal input via the touch ground line TGL and transmit the filtered signal to the inverting input terminal (−) of the inverting amplifier AMP. In this case, a level of the signal to be filtered as the noise component may be controlled according to a value of the second resistor R2. In other words, the second resistor R2 may serve as a switching element for appropriately selecting the noise component in a second feedback signal FB2.

The noise generated from the display ground line DGL and the touch ground line TGL is filtered and synthesized through the resistors R1 and R2 and the capacitors C1 and C2 of the first control circuit 171 and output as the feedback signal FB.

The inverting amplifier AMP receives the feedback signal FB through the first input terminal and receives the ground voltage through the second input terminal. For example, the feedback signal FB may be input to the inverting input terminal (−) of the inverting amplifier AMP, and the ground voltage may be input to the non-inverting input terminal (+).

Here, the ground voltage input to the inverting amplifier AMP may be supplied from the control ground connector CG provided on the control printed circuit board CPCB (see FIG. 2) and may be a voltage directly input from the external host 1, etc. A connection structure of the ground voltage will be described in more detail below with reference to FIG. 3.

In one embodiment, the inverting amplifier AMP may receive a source driving voltage SVDD and an initialization voltage Vini that are supplied from the power supply unit 150 (see FIG. 2) as driving voltages. The source driving voltage SVDD is an internal operating power supplied to the source driver integrated circuit SDIC (see FIG. 1) and may be supplied to drive the inverting amplifier AMP. The initialization voltage Vini is a voltage supplied to initialize the voltage stored in the pixel P and may be supplied to drive the inverting amplifier AMP.

In one embodiment, the source driving voltage SVDD and the initialization voltage Vini may be input to the inverting amplifier AMP through capacitors Cs and Ci connected to the ground voltage, respectively. Capacitances of the capacitors Cs and Ci may be, for example, about 0.1 uF, but is not limited thereto.

The inverting amplifier AMP may include a feedback resistor Rf. The feedback resistor Rf may be connected between the inverting input terminal (−) and an output terminal of the inverting amplifier AMP. The magnitude of the feedback resistance Rf may be, for example, about 9 Kohm, but is not limited thereto.

The inverting amplifier AMP may invert and amplify a signal corresponding to a difference between the feedback signal FB and the ground voltage and output the inverted signal RS. When the feedback signal FB input to the inverting amplifier AMP has a level that is the same as or similar to the ground voltage, the inverted signal RS is output at a level close to zero.

On the other hand, when the feedback signal FB has a level that is not the same as or similar to the ground voltage, the inverting amplifier AMP may invert and amplify the signal corresponding to the difference between the feedback signal FB and the ground voltage and output the inverted and amplified signal. The inverted signal RS output from the inverting amplifier AMP may have a phase inverted by 180 degrees with respect to the feedback signal FB.

The second control circuit 172 may be connected to an output terminal of the inverting amplifier AMP. The second control circuit 172 may include at least one resistor R3, R4, and R5 and a capacitor C3 connected between the output terminal of the inverting amplifier AMP and the ground line.

For example, the second control circuit 172 may include the third capacitor C3 connected to the output terminal of the inverting amplifier AMP. In addition, the second control circuit 172 may include the third resistor R3 connected between the output terminal of the inverting amplifier AMP and the display ground line DGL and the fourth resistor R4 connected between the output terminal of the inverting amplifier AMP and the touch ground line TGL.

The third resistor R3 may filter only the inverted component of the noise component of the display ground line DGL from the inverted signal RS output from the inverting amplifier AMP and output the filtered signal to the display ground line DGL. Similarly, the fourth resistor R4 may filter only the inverted component of the noise component of the touch ground line TGL from the inverted signal RS output from the inverting amplifier AMP and output the filtered signal to the touch ground line TGL. In other words, the resistors R3 and R4 of the second control circuit 172 may serve as switching elements for selectively outputting the inverted signal RS to the display ground line DGL and the touch ground line TGL.

The second control circuit 172 may further include a fifth resistor R5 connected between the output terminal of the inverting amplifier AMP and the source ground connector SG of the source printed circuit board SPCB (see FIG. 2). The fifth resistor R5 may be used to selectively adjust a synthesized voltage level of the inverted signal RS output from the inverting amplifier AMP and the ground voltage output from the source ground connector SG.

The inverted signal RS output via the second control circuit 172 is output to the ground lines formed on the display panel 110, such as the display ground line DGL and the touch ground line TGL. The inverted signal RS may be synthesized with the ground voltage output from the source ground connector SG and output to the display ground line DGL and the touch ground line TGL.

The inverted signal RS has a form of an anti-phase of the noise component generated from the wirings through which the ground voltage is applied to the display panel 110, such as the display ground line DGL and the touch ground line TGL. Therefore, an electromagnetic field of the inverted signal RS may cancel or compensate electromagnetic fields of the noises generated from the display ground line DGL and the touch ground line TGL, thereby minimizing or removing EMI.

In particular, the compensation unit 170 may be configured to cancel all noise generated from the display ground line DGL and the touch ground line TGL during the display driving and the touch driving through one inverted signal RS, thereby simplifying the configuration of the display device 100 configured in the touch integrated type and efficiently removing the noises while reducing the number of wirings.

Figure 4:
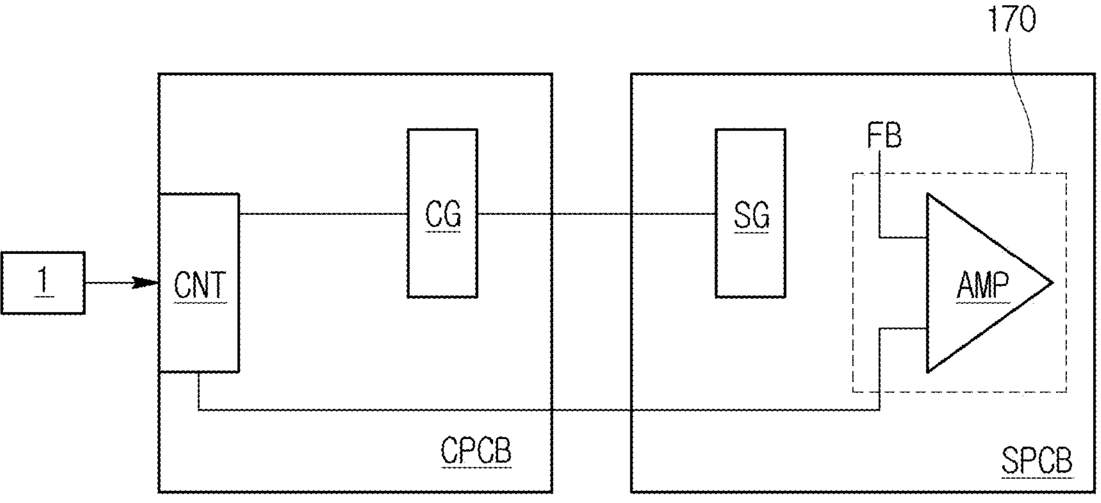
FIG. 4 is a view more specifically showing the connection relationship of the compensation unit of FIG. 2 with a ground voltage according to one embodiment.

FIG. 4 is a view more specifically showing the connection relationship of the compensation unit of FIG. 2 with a ground voltage according to one embodiment. In FIG. 4, for convenience of description, only some components related to the ground voltage connection on the source printed circuit board SPCB and control printed circuit board CPCB are shown.

The compensation unit 170 and the source ground connector SG are formed on the source printed circuit board SPCB. The compensation unit 170 may include the inverting amplifier AMP for receiving the feedback signal FB through the first input terminal (e.g., the inverting input terminal (−)) and receiving the ground voltage through the second input terminal (e.g., the non-inverting input terminal (+)).

The control ground connector CG and a ground input terminal CNT connected to the ground voltage of the external host 1 are formed on the control printed circuit board CPCB. The control ground connector CG may be electrically connected to the ground input terminal CNT. The control ground connector CG may be connected to the source ground connector SG to apply the ground voltage input through the ground input terminal CNT to the source ground connector SG.

The ground input terminal CNT formed on the control printed circuit board CPCB is further connected to the inverting amplifier AMP of the compensation unit 170 formed on the source printed circuit board SPCB. In other words, the ground input terminal CNT of the control printed circuit board CPCB is directly connected to the second input terminal (e.g., the non-inverting input terminal (+)) of the inverting amplifier AMP. In other words, the ground voltage input to the inverting amplifier AMP is wired separately from the control ground connector CG of the control printed circuit board CPCB.

The inverting amplifier AMP of the compensation unit 170 is configured to directly receive the ground voltage provided from the external host 1 as the reference voltage through such a connection relationship. Therefore, the ground voltage provided to the compensation unit 170 may be supplied stably and uniformly, and the compensation unit 170 may generate the inverted signal RS capable of more accurately canceling the noises using the ground voltage as the reference voltage.

Figure 5:
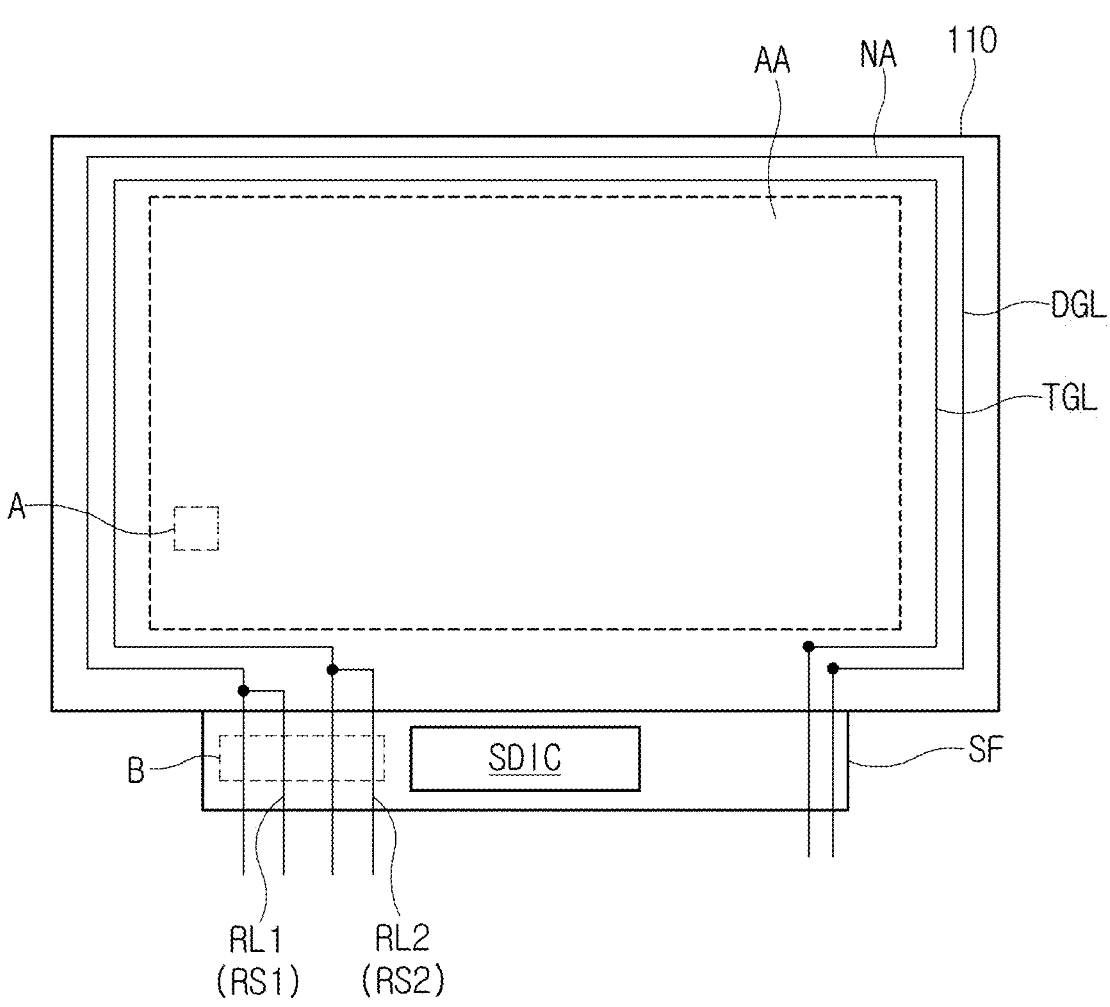
FIG. 5 is an enlarged view showing a connection portion between a ground line and the compensation unit that are formed on a display panel according to one embodiment.

FIG. 5 is an enlarged view showing a connection portion between a ground line and the compensation unit that are formed on a display panel.

Referring to FIG. 5, an input terminal of the compensation unit 170 (see FIG. 2) may be electrically connected to the ground line formed on the display panel 110, such as the display ground line DGL and the touch ground line TGL, at a predetermined location to detect the noises. The location at which the compensation unit 170 and the ground line are connected may be determined in any of various ways. In one embodiment, the compensation unit 170 may be connected to the ground line at one side of the non-display area NA as shown.

The compensation unit 170 may invert and amplify the signal corresponding to the difference between the feedback signal FB and the ground voltage and output the inverted and amplified signal as inverted signals RS1 and RS2. The compensation unit 170 may apply the generated inverted signal RS1 and RS2 to the ground line through which the original signal is respectively applied through the inverted signal line RL1, RL2.

An output terminal of the compensation unit 170 may be electrically connected to the ground line disposed on the display panel 110 at a predetermined location to provide the inverted signals RS1 and RS2. In this case, the compensation unit 170 may be connected to the ground line through the inverted signal lines RL1 and RL2 branched from the output terminal thereof and extending adjacent to each ground line.

For example, the compensation unit 170 may be connected to the display ground line DGL through the first inverted signal line RL1 branched from the output terminal and extending adjacent to the display ground line DGL. In addition, the compensation unit 170 may be connected to the touch ground line TGL through the second inverted signal line RL2 branched from the output terminal and extending adjacent to the touch ground line TGL. In the present embodiment, the compensation unit 170 may output the first inverted signal RS1 to the display ground line DGL through the first inverted signal line RL1 and output the second inverted signal RS2 to the touch ground line TGL through the second inverted signal line RL2.

Locations at which the inverted signal lines RL1 and RL2 and the ground line are connected may be determined in any of various ways. In one embodiment, the inverted signal lines RL1 and RL2 may be connected to the ground line at the other side of the non-display area NA as shown. Here, the other side of the non-display area NA may be a location opposite to one side at which the input terminal of the compensation unit 170 and the ground line are connected to detect the noises. However, the present embodiment is not limited thereto.

Figure 6:
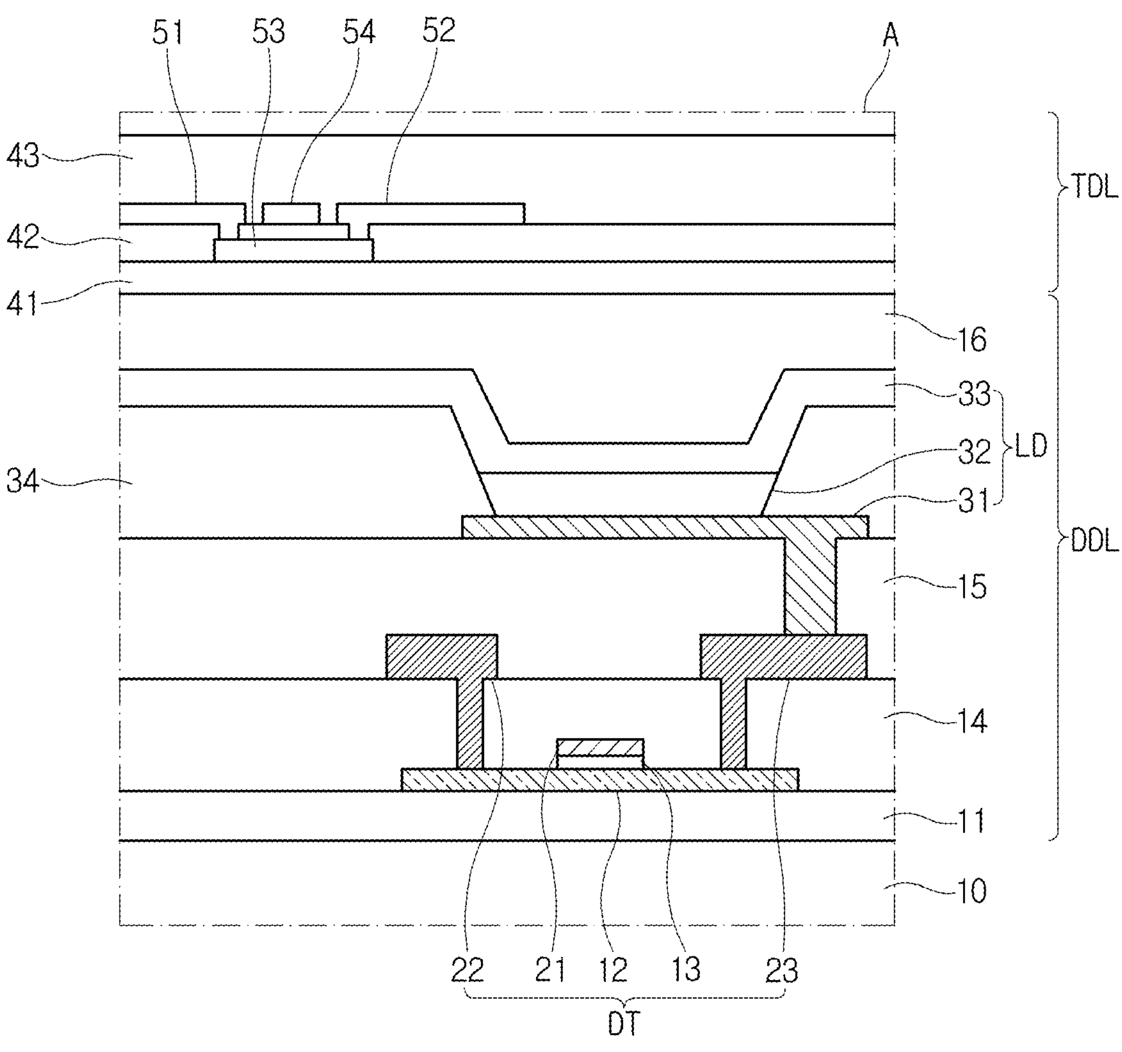
FIG. 6 is a cross-sectional view of one embodiment of area A in FIG. 5 according to one embodiment.

FIG. 6 is a cross-sectional view of one embodiment of area A in FIG. 5 according to one embodiment.

Area A in FIG. 5 is a portion of the display area AA and includes a substrate 10, a display driving layer DDL which is formed on the substrate 10 and on which the pixels P (see FIG. 1) are disposed, and a touch driving layer TDL which is formed on the display driving layer DDL and on which the touch electrodes TE (see FIG. 1) are disposed.

The substrate 10 may be a base substrate on which the circuit elements and the light emitting elements LD are disposed and may be a light transmissive substrate. The substrate 10 may be a rigid substrate including glass or tempered glass, or a flexible substrate made of a plastic material.

The display driving layer DDL may be disposed on the substrate 10. Specifically, the buffer layer 11 may be formed on the substrate 10. The buffer layer 11 can prevent ions or impurities from diffusing from the substrate 10 and block moisture permeation. In addition, the buffer layer 11 can improve the surface flatness of the substrate 10. The buffer layer 11 may include an inorganic material, such as oxide or nitride, an organic material, or an organic-inorganic composite and may be formed in a single-layer or multilayered structure. For example, the buffer layer 11 may have a structure of triple or more layers made of silicon oxide, silicon nitride, and silicon oxide.

An active layer 12 may be formed on the buffer layer 11. The active layer 12 may be made of a silicon-based semiconductor material or an oxide-based semiconductor material. Amorphous silicon or polycrystalline silicon can be used as the silicon-based semiconductor material. As oxide-based semiconductor materials, indium tin gallium zinc oxide (InSnGaZnO) which is quaternary metal oxide, indium gallium zinc oxide (InGaZnO), indium tin zinc oxide (InSnZnO), indium aluminum zinc oxide (InAlZnO), indium gallium zinc oxide (SnGaZnO), aluminum gallium zinc oxide (AlGaZnO), tin aluminum zinc oxide (SnAlZnO), which are which are ternary metal oxides, indium zinc oxide (InZnO), tin zinc oxide (SnZnO), aluminum zinc oxide (AlZnO), zinc magnesium oxide (ZnMgO), tin magnesium oxide (SnMgO), indium magnesium oxide (InMgO), indium gallium oxide (InGaO), indium oxide (InO), tin oxide (SnO), zinc oxide (ZnO), which are binary metal oxides, and the like can be used.

The active layer 12 may include a source area and a drain area containing p-type or n-type impurities, and a channel area formed between the source area and the drain area.

A gate insulating layer 13 may be formed on the active layer 12. The gate insulating layer 13 may be silicon oxide ($SiO_x$), silicon nitride ($SiN_x$), or a multilayer thereof.

A first conductive layer is formed on the gate insulating layer 13. The first conductive layer may include a gate electrode 21. The gate electrode 21 may be disposed to overlap the channel area of the corresponding active layer 12. The first conductive layer may further include the gate line GL (not shown) (see FIG. 1), etc.

An interlayer insulating layer 14 may cover the first conductive layer. The interlayer insulating layer 14 may be silicon oxide ($SiO_x$), silicon nitride ($SiN_x$), or a multilayer thereof.

The second conductive layer is formed on the interlayer insulating layer 14. The second conductive layer may include a source electrode 22 and a drain electrode 23. The source electrode 22 and the drain electrode 23 may be respectively connected to the source area and drain area of the active layer 12 through contact holes. The source electrode 22, the drain electrode 23, the gate electrode 21, and the corresponding active layer 12 may form a transistor. In FIG. 6, an example in which a driving transistor DT for controlling the amount of current to be provided to the light emitting element LD to be described below is shown.

The second conductive layer may be covered by an overcoat layer 15. The overcoat layer 15 may be a planarization film for reducing a step of a lower structure.

The light emitting element LD may be disposed on the overcoat layer 15. The light emitting element LD includes an anode 31, a light emitting layer 32, and a cathode 33.

The anode 31 is formed on the overcoat layer 15. The anode 31 is connected to the drain electrode 23 of the driving transistor DT through a via hole passing through the overcoat layer 15.

A bank 34 is further formed on the overcoat layer 15. The bank 34 is formed to cover an edge of the anode 31.

The light emitting layer 32 is formed on the anode 31. The light emitting layer 32 is formed on an area of the anode 31 which is not covered by the bank 34 and is exposed. In other words, the light emitting layer 32 may be formed in an area surrounded by the bank 34.

The cathode 33 is widely deposited on the substrate 10. The cathode 33 is formed on the light emitting layer 32 and the bank 34. In other words, the cathode 33 may be formed to cover the light emitting layer 32 and the bank 34.

An encapsulation layer 16 may be formed on the cathode 33. The encapsulation layer 16 includes at least one inorganic film, which can prevent oxygen or moisture from permeating the light emitting element LD. The encapsulation layer 16 includes at least one organic film, which can protect the light emitting element LD from foreign substance such as dust.

A touch driving layer TDL is formed on the encapsulation layer 16. Specifically, a touch buffer layer 41 may be formed on the encapsulation part 16. The touch buffer layer 41 can block a chemical solution (developer, etchant, etc.) used in a process of manufacturing conductive layers disposed on the touch buffer layer 41 or external moisture, etc. from permeating the light emitting layer 32 containing the organic material.

The touch buffer layer 41 may be formed at a low temperature of a predetermined temperature or lower (e.g., 100° C.) to prevent or at least reduce damage to the light emitting layer 32 containing an organic material vulnerable to high temperatures and made of an organic insulating material having a low dielectric constant of 1 to 3. For example, the touch buffer layer 41 may be made of an acrylic-based, epoxy-based, or siloxan-based material. The touch buffer layer 41 made of an organic insulating material and having planarization performance can prevent damage to the encapsulation layer 16 due to the bending of an OLED display device and cracking of the conductive layers formed on the touch buffer layer 41.

According to a mutual-capacitance-based touch sensor structure, a touch conductive layer is disposed on the touch buffer layer 41. The touch conductive layer may include touch electrodes 51 and 52. The touch electrodes 51 and 52 may be disposed to intersect each other in a second touch conductive layer.

Touch bridge electrodes 53 and 54 may electrically connect the touch electrodes 51 and 52. The touch bridge electrodes 53 and 54 and the touch electrodes 51 and 52 may be located on different layers with a touch insulating layer 42 interposed therebetween.

A touch protective film 43 may be disposed on the touch electrodes 51 and 52.

Figure 7:
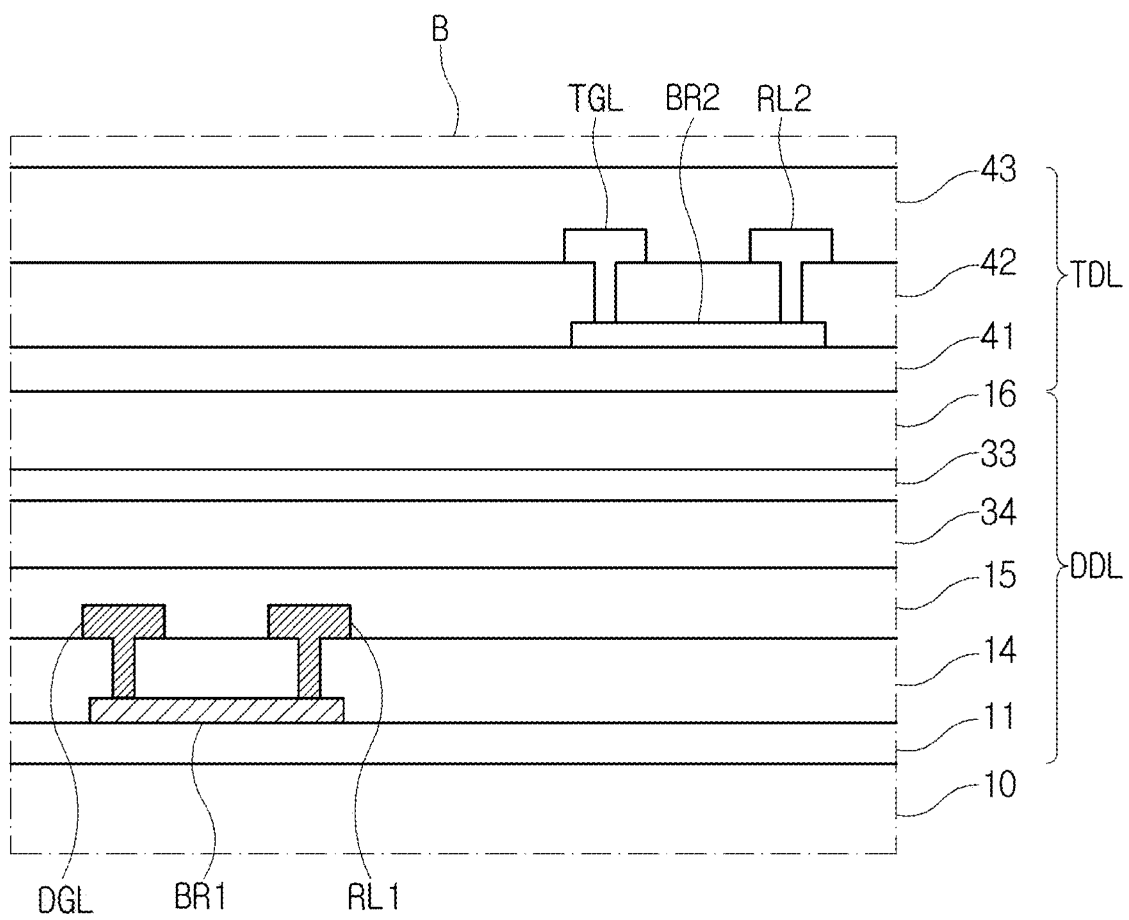
FIG. 7 is a cross-sectional view of one embodiment of area B in FIG. 5 according to one embodiment.

FIG. 7 is a cross-sectional view of one embodiment of area B in FIG. 5 according to one embodiment.

Area B in FIG. 5 is a portion of the non-display area NA and has the same stacking structure as the display area AA shown in FIG. 5. Specifically, area B includes the substrate 10, the display driving layer DDL disposed on the substrate, and the touch driving layer TDL disposed on the display driving layer DDL.

The display ground line DGL and the low potential inverted signal line RL1 may be formed on the second conductive layer in the non-display area NA. The display ground line DGL may receive the low potential driving voltage ELVSS from the power supply unit 150 (see FIG. 1) and transmit the low potential driving voltage ELVSS to the pixels P (see FIG. 1). When the low potential driving voltage ELVSS is the ground voltage, the display ground line DGL may be connected to the source ground connector SG of the source printed circuit board SPCB to receive the ground voltage.

The first inverted signal line RL1 may be connected to the output terminal of the compensation unit 170 (see FIG. 2) to receive the inverted signal RS output from the compensation unit 170.

The display ground line DGL and the first inverted signal line RL1 may be connected to the first bridge electrode BR1 formed on the first conductive layer through the contact hole passing through the interlayer insulating layer 14. In other words, the first inverted signal line RL1 may be connected to the display ground line DGL through the first bridge electrode BR1 in the non-display area NA. Therefore, the first inverted signal RS1 applied to the first inverted signal line RL1 may be applied to the display ground line DGL.

The first inverted signal RS1 is formed through the compensation unit 170 and may be an inverted signal of the noise component of the low potential driving voltage ELVSS applied to the display panel 110. As the first inverted signal RS1 is applied to the display ground line DGL through the first bridge electrode BR1, the noise generated from the display panel 110 by the low potential driving voltage ELVSS can be canceled.

The touch ground line TGL and the second inverted signal line RL2 may be formed on the touch conductive layer in the non-display area NA. The touch ground line TGL may be connected to the source ground connector SG of the source printed circuit board SPCB to receive the ground voltage.

The second inverted signal line RL2 may be connected to the output terminal of the compensation unit 170 (see FIG. 2) to receive the inverted signal RS output from the compensation unit 170.

The touch ground line TGL and the second inverted signal line RL2 may be connected to the second bridge electrode BR2 through the contact hole passing through the touch insulating layer 42. In other words, the second inverted signal line RL2 may be connected to the touch ground line TGL through the second bridge electrode BR2 in the non-display area NA. Therefore, the second inverted signal RS2 applied to the second inverted signal line RL2 may be applied to the touch ground line TGL.

The second inverted signal RS2 is formed through the compensation unit 170 and may be an inverted signal of the noise component of the touch ground voltage applied to the display panel 110. As the second inverted signal RS2 is applied to the touch ground line TGL through the second bridge electrode BR2, the noise generated from the display panel 110 by the touch ground voltage can be canceled.

Figure 8:
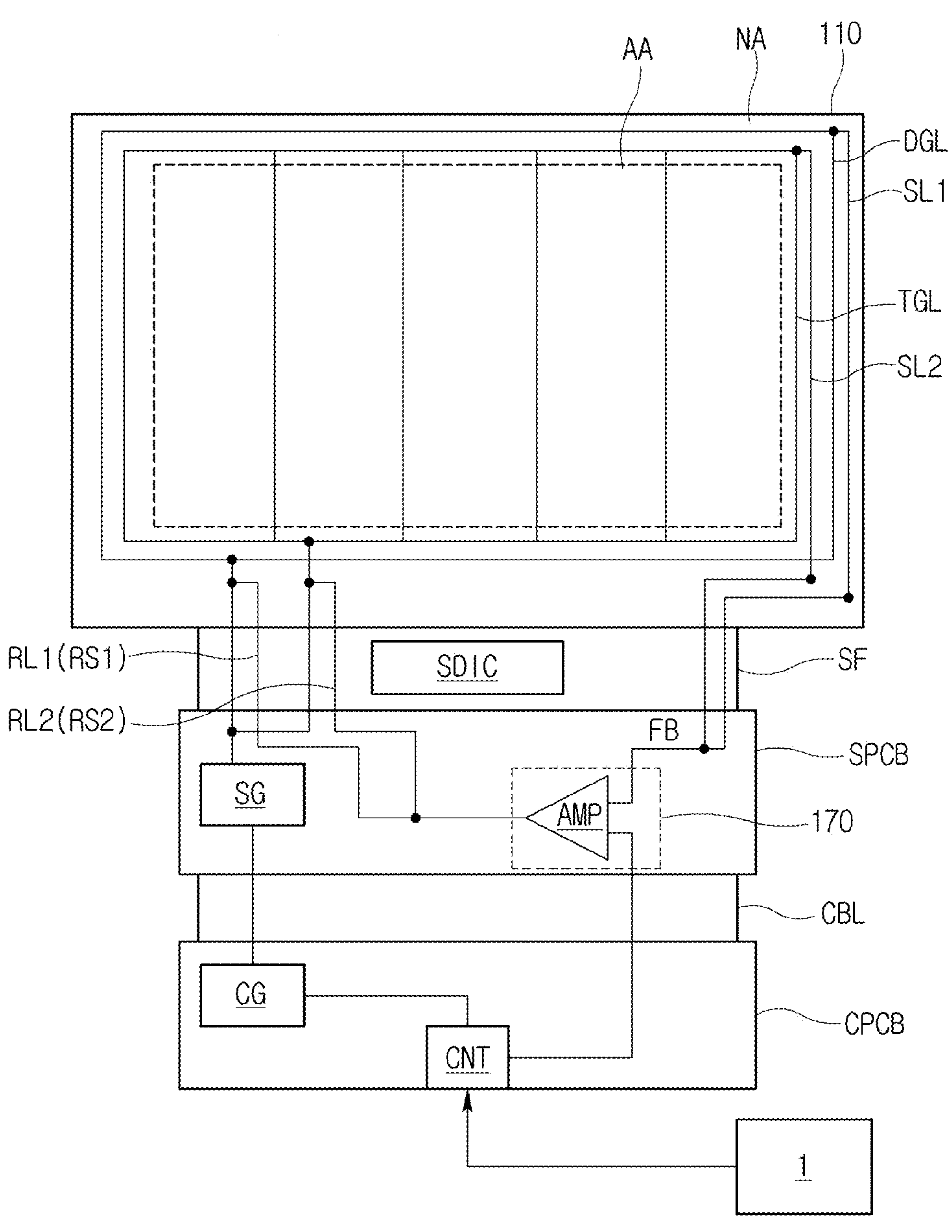
FIG. 8 is a schematic plan view of a display device according to another embodiment.

FIG. 8 is a schematic plan view of a display device according to another embodiment.

Referring to FIG. 8, the driving unit and lines for driving the pixels P may be disposed on the display panel 110.

For example, the display ground line DGL through which the ground voltage is applied as the low potential driving voltage ELVSS (see FIG. 1) may be disposed on the display panel 110. The display ground line DGL may be a planar electrode formed in the entirety of the display area AA of the display panel 110. The display ground line DGL may extend from the display area AA to a portion of the non-display area NA.

The touch ground line TGL may be further disposed on the display panel 110. The touch ground line TGL may be a planar electrode extending on the display area AA in which the touch electrodes TE (see FIG. 1) are disposed.

The input terminal of the compensation unit 170 may be electrically connected to the ground line formed on the display panel 110, such as the display ground line DGL and the touch ground line TGL at a predetermined location to detect the noises. In the present embodiment, sensing lines SL1 and SL2 for connecting the compensation unit 170 with the ground line may be further provided. For example, the compensation unit 170 may be connected to the display ground line DGL through the first sensing line SL1 and connected to the touch ground line TGL) through the second sensing line SL2.

The sensing lines SL1 and SL2 may be connected to the display ground line DGL and the touch ground line TGL, respectively, at one side of the display panel 110 through the contact holes, etc. In addition, the sensing lines SL1 and SL2 may extend along the edge of the display panel 110, and then, are connected to the circuit film SF at the other side of the display panel 110 to transmit the feedback signal FB to the compensation unit 170.

Hereinafter, the connection relationship between the sensing lines SL1 and SL2, the display ground line DGL, and the touch ground line TGL will be described in more detail.

Figure 9:
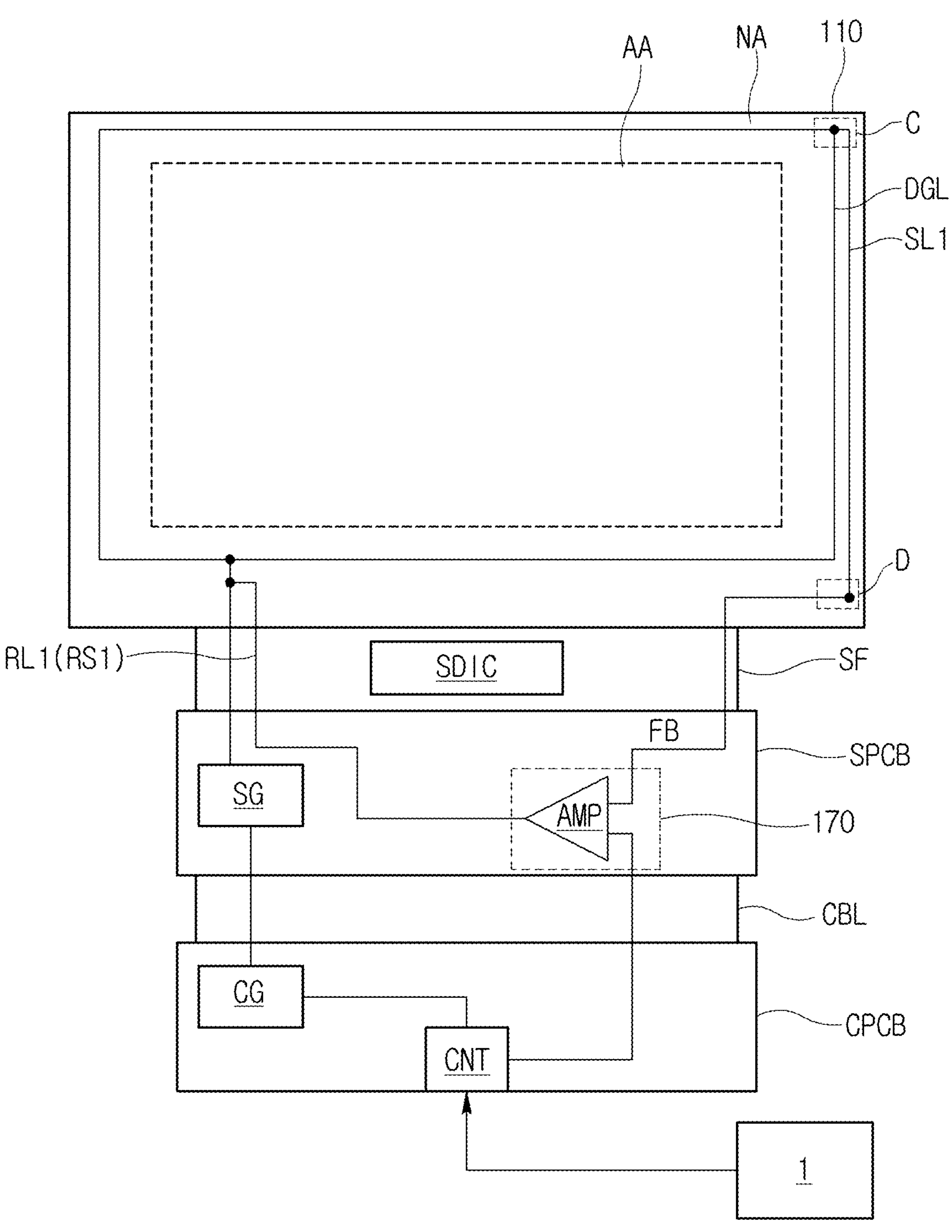
FIG. 9 is a plan view showing only components connected to a display ground line in FIG. 8 according to one embodiment.
Figure 10:
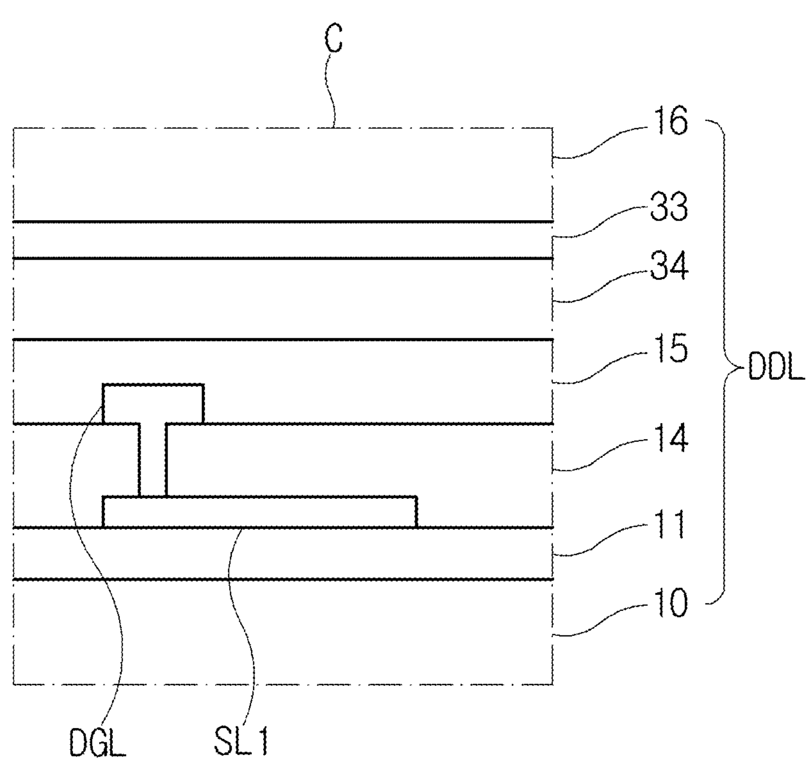
FIG. 10 is a schematic cross-sectional view of area C in FIG. 9 according to one embodiment.
Figure 11:
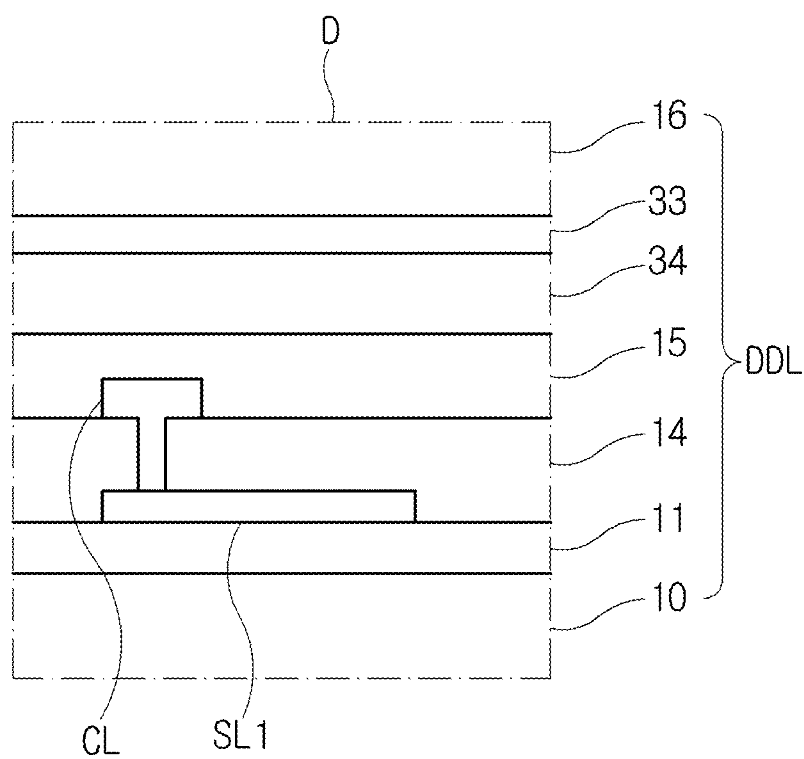
FIG. 11 is a schematic cross-sectional view of area D in FIG. 9 according to one embodiment.

FIG. 9 is a plan view showing only components connected to a display ground line in FIG. 8 according to one embodiment. FIG. 10 is a schematic cross-sectional view of area C in FIG. 9 according to one embodiment. FIG. 11 is a schematic cross-sectional view of area D in FIG. 9 according to one embodiment.

As described above, the compensation unit 170 may receive the feedback signal FB from the display ground line DGL of the display panel 110. The compensation unit 170 may detect the noise generated from the display panel 110 through the feedback signal FB.

In one embodiment, the display panel 110 may further include the separate first sensing line SL1 for transmitting the feedback signal FB to the compensation unit 170. The first sensing line SL1 may be connected to the outermost part of the display ground line DGL at one side C of the display panel 110, may extend along the edge of the display panel 110, and then may be connected to the circuit film SF at the other side F of the display panel 110.

For example, the first sensing line SL1 may be connected to the display ground line DGL at a point on the display panel 110 farthest from the source printed circuit board SPCB to sense the signal of the display ground line DGL. In particular, the first sensing line SL1 may be connected to the display ground line DGL at a corner area C on the display panel 110 farthest from the source ground connector SG. In the area C, a resistance of the display ground line DGL may be the greatest.

In the present embodiment, the first sensing line SL1 may be disposed on a different layer from the display ground line DGL. Referring to FIGS. 6 and 10 together, when the display ground line DGL is formed on the second conductive layer, the first sensing line SL1 may be formed on the first conductive layer. The display ground line DGL and the first sensing line SL1 may be connected through the contact holes at one side of the display panel 110. For example, the display ground line DGL and the first sensing line SL1 may be connected through the contact holes at the corner at one side of the display panel 110, but the present embodiment is not limited thereto.

In one embodiment, the first sensing line SL1 and the lines formed on the circuit film SF may be disposed on different layers. For example, the lines formed on the circuit film SF may be formed to correspond to the second conductive layer of the display panel 110. In the present embodiment, the first sensing line SL1 may be connected to a connection line CL formed on the second conductive layer through a contact hole at the other side D of the display panel 110 as shown in FIG. 11 and connected to the lines on the circuit film SF through the connection line CL.

The first inverted signal RS1 generated by the compensation unit 170 is applied to the display ground line DGL through the first inverted signal line RL1. The first inverted signal line RL1 may be connected to the display ground line DGL at one side of the display panel 110 in contact with the circuit film SF. When the display ground line DGL is formed on the second conductive layer on the display panel 110, the first inverted signal line RL1 may be connected to the display ground line DGL on the second conductive layer through the first bridge electrode BR1, the contact hole, etc. as described with reference to FIG. 7.

Figure 12:
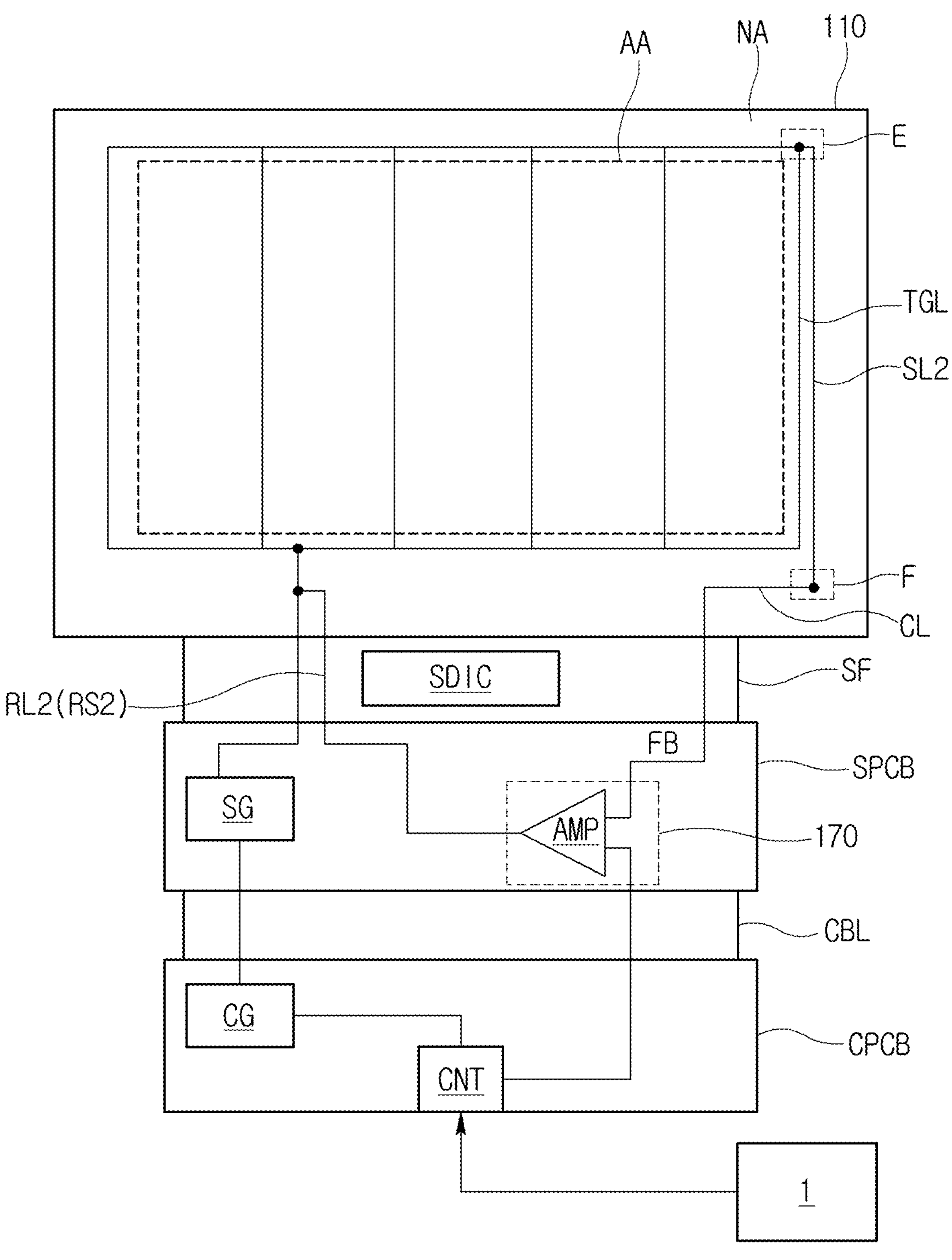
FIG. 12 is a plan view showing only components connected to a touch ground line in FIG. 8 according to one embodiment.
Figure 13:
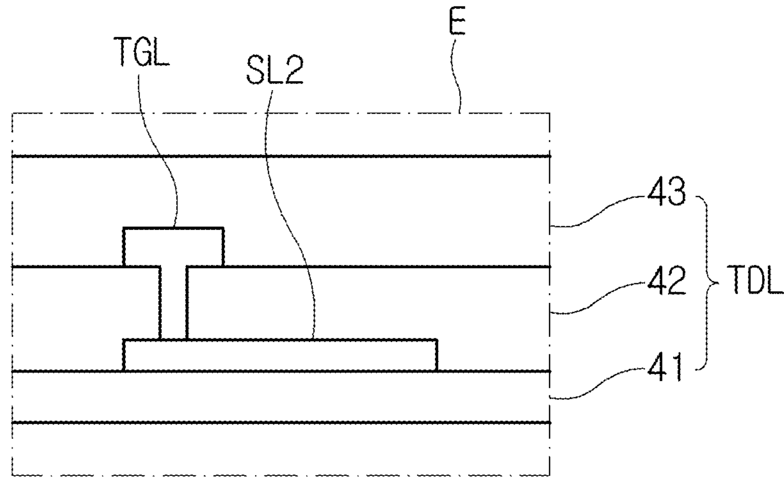
FIG. 13 is a schematic cross-sectional view of area E in FIG. 12 according to one embodiment.
Figure 14:
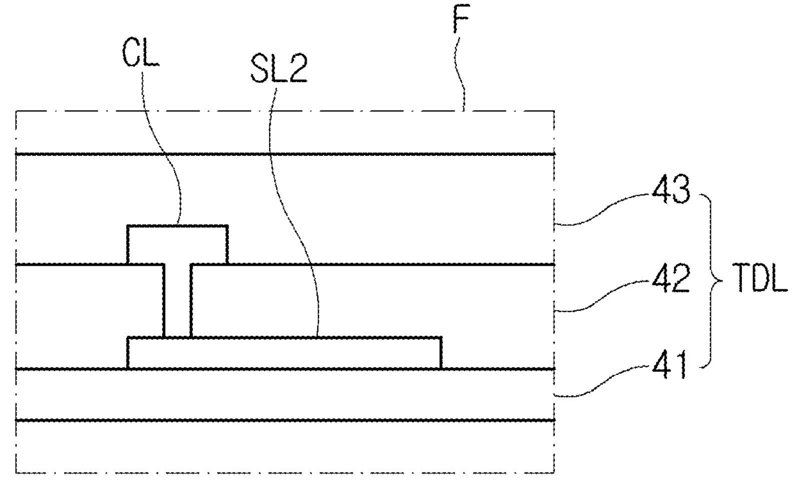
FIG. 14 is a schematic cross-sectional view of area Fin FIG. 12 according to one embodiment.

FIG. 12 is a plan view showing only components connected to a touch ground line in FIG. 8 according to one embodiment. FIG. 13 is a schematic cross-sectional view of area E in FIG. 12 according to one embodiment. FIG. 14 is a schematic cross-sectional view of area F in FIG. 12 according to one embodiment.

As described above, the compensation unit 170 may receive the feedback signal FB from the touch ground line TGL of the display panel 110. The compensation unit 170 may detect the noise generated from the display panel 110 through the feedback signal FB.

In one embodiment, the display panel 110 may further include the separate second sensing line SL2 for transmitting the feedback signal FB to the compensation unit 170. The second sensing line SL2 may be connected to the outermost part of the touch ground line TGL at one side E of the display panel 110, may extend along the edge of the display panel 110, and then may be connected to the circuit film SF at the other side F of the display panel 110.

For example, the second sensing line SL2 may be connected to the touch ground line TGL at a point on the display panel 110 farthest from the source printed circuit board SPCB to sense the signal of the touch ground line TGL. In particular, the second sensing line SL2 may be connected to the touch ground line TGL at a corner area E on the display panel 110 farthest from the source ground connector SG. In the area E, a resistance of the touch ground line TGL may be the greatest.

In the present embodiment, the second sensing line SL2 may be disposed on a different layer from the touch ground line TGL. Referring to FIGS. 6 and 13 together, when the touch ground line TGL is formed on the touch conductive layer, the second sensing line SL2 may be formed on the bridge layer that is a lower layer. The touch ground line TGL and the second sensing line SL2 may be connected through the contact holes at one side of the display panel 110. For example, the touch ground line TGL and the second sensing line SL2 may be connected through the contact holes at the corner at one side of the display panel 110, but the present embodiment is not limited thereto.

In one embodiment, the second sensing line SL2 and the lines formed on the circuit film SF may be disposed on different layers. For example, the lines formed on the circuit film SF may be formed to correspond to the touch conductive layer of the display panel 110. In the present embodiment, the second sensing line SL2 may be connected to the connection line CL formed on the bridge layer through the contact hole at the other side F of the display panel 110 as shown in FIG. 14 and connected to the lines on the circuit film SF through the connection line CL.

The second inverted signal RS2 generated by the compensation unit 170 is applied to the touch ground line TGL through the second inverted signal line RL2. The second inverted signal line RL2 may be connected to the touch ground line TGL at one side of the display panel 110 in contact with the circuit film SF. When the touch ground line TGL is formed on the touch conductive layer on the display panel 110, the second inverted signal line RL2 may be connected to the touch ground line TGL on the touch conductive layer through the second bridge electrode BR2, the contact hole, etc. as described with reference to FIG. 7.

Figure 15:
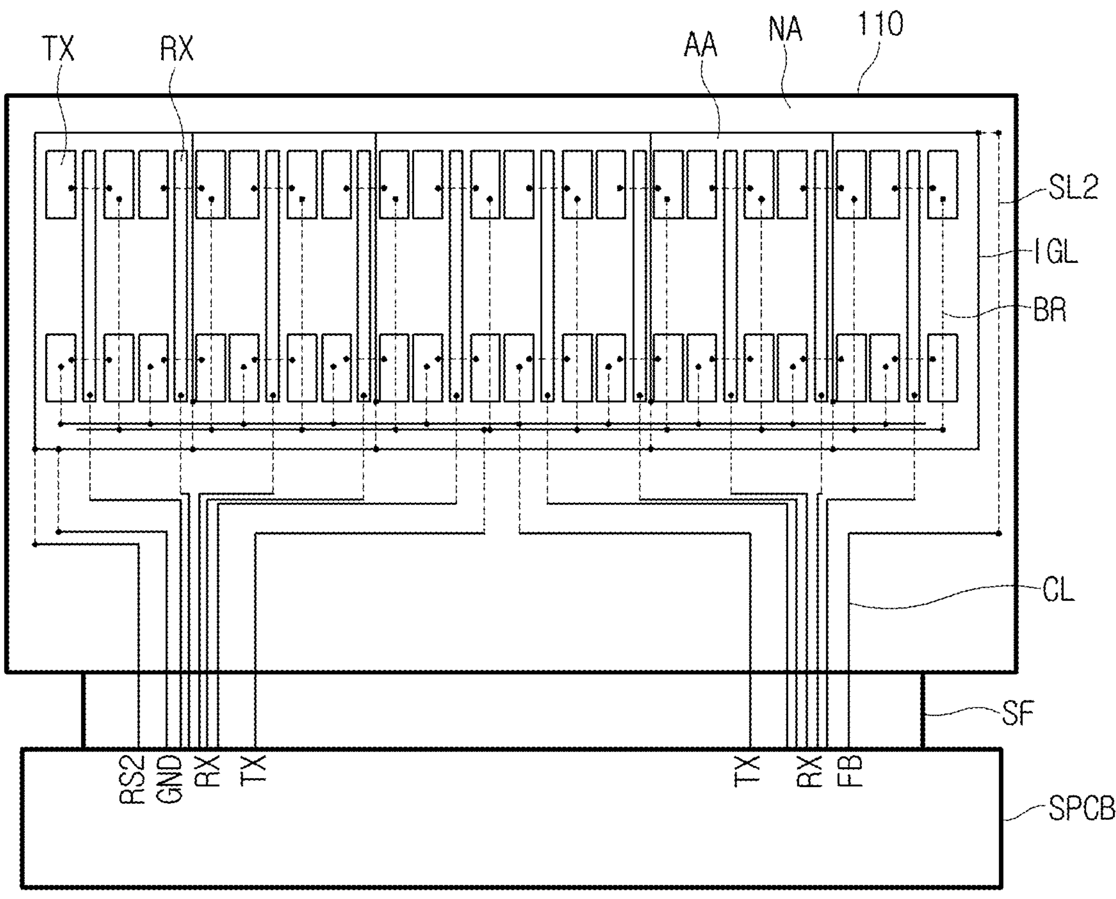
FIG. 15 is a plan view schematically showing the connection relationship between a touch electrode, the touch ground line, and the compensation unit according to one embodiment.

FIG. 15 is a plan view schematically showing the connection relationship between a touch electrode, the touch ground line, and the compensation unit according to one embodiment. In FIG. 15, solid lines indicate lines formed on a touch electrode layer, and dotted lines indicate lines formed on a bridge electrode layer.

Referring to FIG. 15, a plurality of touch electrodes TX and RX for touch sensing may be disposed in the display area AA of the display panel 110. The touch electrodes TX and RX may include the driving electrode TX and the sensing electrode RX. The driving electrode TX may be electrically connected through bridge electrodes BR formed on a bridge layer.

The driving electrode TX may be connected to the source printed circuit board SPCB through the touch driving line TDL to receive the touch driving signal, and the sensing electrode RX may be connected to the source printed circuit board SPCB through the touch sensing line TL to output the touch sensing signal. When the touch driving signal is applied to the driving electrode TX, a touch may be sensed by detecting a change in parasitic capacitance generated between the driving electrode TX and the sensing electrode RX through the touch sensing signal.

The touch ground line TGL may be disposed in the non-display area NA near the display area AA. In addition, the second sensing line SL2 connected to the touch ground line TGL may be further disposed. The second sensing line SL2 may be connected to the outermost part of the touch ground line TGL at one side of the display panel 110, may extend along the edge of the display panel 110, and then may be connected to the circuit film SF at the other side of the display panel 110.

In the present embodiment, the second sensing line SL2 may be disposed on a different layer from the touch ground line TGL. When the touch ground line TGL is formed on the touch conductive layer, the second sensing line SL2 may be formed on the bridge layer that is a lower layer. The touch ground line TGL and the second sensing line SL2 may be connected through the contact holes at one side of the display panel 110. For example, the touch ground line TGL and the second sensing line SL2 may be connected through the contact holes at the corner at one side of the display panel 110, but the present embodiment is not limited thereto.

In one embodiment, the second sensing line SL2 and the lines formed on the circuit film SF may be disposed on different layers. For example, the lines formed on the circuit film SF may be formed to correspond to the touch conductive layer of the display panel 110. In the present embodiment, the second sensing line SL2 may be connected to the connection line CL formed on the second conductive layer through the contact hole at the other side of the display panel 110 and connected to the lines on the circuit film SF through the connection line.

According to the display device according to the embodiments, by canceling all of the noise generated during the display driving and the noise generated during the touch driving using one inverted signal, it is possible to simplify the configuration of the display device and reduce the number of signal lines.

In addition, according to the display device according to the embodiments, it is possible to increase the accuracy of the inverted signal using the ground voltage applied from the outside as the reference voltage of the inverted signal.

In addition, according to the display device according to the embodiments, it is possible to increase the field cancel efficiency between the original signal and the inverted signal and improve the electromagnetic interference prevention effect.

Although the embodiments of the present invention have been described above with reference to the accompanying drawings, those skilled in the art to which the present invention pertains will be able to understand that the above-described technical configuration of the present invention can be carried out in other specific forms without changing the technical spirit or essential features thereof. Therefore, it should be understood that the above-described embodiments are illustrative and not restrictive in all respects. In addition, the scope of the present invention is described by the claims to be described below rather than the detailed description. In addition, the meaning and scope of the claims and all changed or modified forms derived from the equivalent concept should be construed as being included in the scope of the present invention.

What is claimed is:

1. A display device comprising:

a display panel including a display area in which pixels and touch electrodes are disposed and a non-display area surrounding the display area;

a ground line in the non-display area, the ground line configured to apply a ground voltage to the display panel during display driving and touch driving; and a compensation circuit configured to receive a feedback signal from the ground line and output an inverted signal having an anti-phase of the feedback signal to the ground line.

2. The display device of claim 1, wherein the ground line includes:

a display ground line through which the ground voltage is applied to the pixels during the display driving; and a touch ground line through which the ground voltage is applied to the display panel during the touch driving.

3. The display device of claim 2, wherein the display ground line is arranged along the non-display area and surrounds the display area, and the touch ground line is arranged along the non-display area closer to the display area than the display ground line.

4. The display device of claim 2, wherein the compensation circuit includes an inverting amplifier configured to receive the feedback signal from the display ground line during the display driving and from the touch ground line during the touch driving through a first input terminal, receive the ground voltage through a second input terminal, invert and amplify a signal corresponding to a difference between the feedback signal and the ground voltage, and output the inverted and amplified signal to an output terminal as the inverted signal.

5. The display device of claim 4, wherein the first input terminal of the inverting amplifier is electrically connected to the display ground line and the touch ground line at one side of the non-display area, and the output terminal of the inverting amplifier is electrically connected to the display ground line and the touch ground line at another side opposite to the one side of the non-display area.

6. The display device of claim 4, wherein the compensation circuit further includes:

a first control circuit connected to the first input terminal of the inverting amplifier, the first control circuit including at least one resistor connected between the first input terminal and the ground line; and a second control circuit connected to the output terminal of the inverting amplifier, the second control circuit including at least one resistor connected between the output terminal and the ground line.

7. The display device of claim 4, further comprising:

a source printed circuit board connected to the display panel through a circuit film; and a control printed circuit board connected to the source printed circuit board through a connection cable and receive the ground voltage from an external host through a ground input terminal.

8. The display device of claim 7, wherein the compensation circuit is on the source printed circuit board.

9. The display device of claim 7, wherein the second input terminal of the inverting amplifier is directly connected to the ground input terminal of the control printed circuit board.

10. The display device of claim 4, wherein the inverting amplifier outputs the inverted signal to the ground line through an inverted signal line, and the inverted signal line and the ground line are electrically connected through a bridge electrode.

11. The display device of claim 10, wherein the inverted signal line includes:

a first inverted signal line branched from the output terminal of the compensation circuit and extending adjacent to the display ground line; and a second inverted signal line branched from the output terminal of the compensation circuit and extending adjacent to the touch ground line.

12. The display device of claim 11, wherein the display panel includes:

a substrate;

a display driving layer on the substrate and on which the pixels are disposed; and a touch driving layer on the display driving layer and on which the touch electrodes are disposed.

13. The display device of claim 12, wherein the display driving layer includes:

a buffer layer on the substrate;

a first bridge electrode on the buffer layer;

an interlayer insulating layer on the first bridge electrode; and the display ground line and the first inverted signal line on the interlayer insulating layer, and the display ground line and the first inverted signal line are electrically connected through the first bridge electrode.

14. The display device of claim 12, wherein the touch driving layer includes:

a touch buffer layer on the display driving layer;

a second bridge electrode on the touch buffer layer;

a touch insulating layer on the second bridge electrode; and the touch ground line and the second inverted signal line on the touch insulating layer, and the touch ground line and the second inverted signal line are electrically connected through the second bridge electrode.

15. The display device of claim 2, wherein the feedback signal includes noise components generated from the display ground line and the touch ground line, and the compensation circuit is configured to cancel the noise components generated from the display ground line and the touch ground line using one inverted signal.

16. The display device of claim 1, wherein the display panel further comprises:

a sensing line connecting the ground line with the compensation circuit, wherein the sensing line is on a different layer from the ground line, connected to the ground line through a contact hole at one side of the display panel, connected to a connection line through a contact hole at another side of the display panel, and connected to the compensation circuit through the connection line.

17. A display device comprising:

a display panel including a display area in which pixels and touch electrodes are disposed and a non-display area surrounding the display area;

a ground line in the non-display area, the ground line configured to apply a ground voltage to the display panel during display driving and touch driving;

a compensation circuit configured to receive a feedback signal from the ground line and output an inverted signal having an anti-phase of the feedback signal to the ground line;

a source printed circuit board connected to the display panel through a circuit film; and a control printed circuit board connected to the source printed circuit board through a connection cable to receive the ground voltage from an external host through a ground input terminal, wherein the compensation circuit is directly connected to the ground input terminal of the control printed circuit board and uses a ground voltage directly applied from an external host as a reference voltage which is used for comparing with the feedback signal to derive the inverted signal.

18. The display device of claim 17, wherein the compensation circuit is on the source printed circuit board.

* * * * *